United States Patent [19]

Sato

[11] 4,151,470
[45] Apr. 24, 1979

[54] COMBINED PORTABLE TAPE RECORDER AND STEREOPHONIC RECEIVER SYSTEM

[75] Inventor: Masaaki Sato, Hachioji, Japan

[73] Assignee: Olympus Optical Co., Ltd., Tokyo, Japan

[21] Appl. No.: 809,167

[22] Filed: Jun. 23, 1977

Related U.S. Application Data

[62] Division of Ser. No. 596,172, Jul. 15, 1975, Pat. No. 4,046,973.

[30] Foreign Application Priority Data

| Jul. 18, 1974 | [JP] | Japan | 49-81663 |
| Jul. 22, 1974 | [JP] | Japan | 49-83906 |
| Nov. 9, 1974 | [JP] | Japan | 49-129184 |
| Nov. 9, 1974 | [JP] | Japan | 49-129185 |
| Nov. 14, 1974 | [JP] | Japan | 49-131284 |

[51] Int. Cl.² ................... H04B 1/20; G11B 31/00
[52] U.S. Cl. .................. 325/311; 179/100.11; 179/1 G; 179/1 GP
[58] Field of Search .......... 325/311, 36; 179/1 G, 179/1 GP, 100.1 A, 100.11, 100.12 A, 100.12 R, 100.41 R, 100.41 C, 100.41 K, 1 SW

[56] References Cited

U.S. PATENT DOCUMENTS

| 3,294,917 | 12/1966 | Lempert | 325/311 |
| 3,646,278 | 2/1972 | Panizzi | 179/100.11 |
| 3,916,122 | 10/1975 | Sato et al. | 179/100.11 |

FOREIGN PATENT DOCUMENTS

1232719 10/1960 France ........................... 325/36

OTHER PUBLICATIONS

Tandberg 9200XD, reprinted from Stereo Review, Nov. 1974.
Stereo Review, Jun. 1976, Sony Front-Load Cassette Decks, Sony TC-186, 204, 209SD.
The New Sansui, Stereo Review, Jun. 1976, The Sansui 9090.

*Primary Examiner*—Robert L. Griffin
*Assistant Examiner*—Tommy P. Chin
*Attorney, Agent, or Firm*—Ostrolenk, Faber, Gerb & Soffen

[57] ABSTRACT

An acoustic apparatus comprising a detachable combination of a stereophonic radio set and monaural tape recorder is disclosed. The tape recorder operates as a monaural element when decoupled from the stereophonic radio but includes a stereophonic head which cooperates with stereophonic elements in the stereophonic radio to produce a stereophonic output when the tape recorder and radio are coupled together.

4 Claims, 9 Drawing Figures

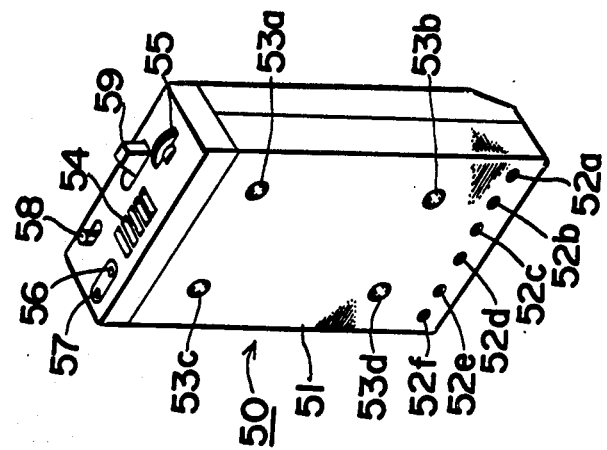
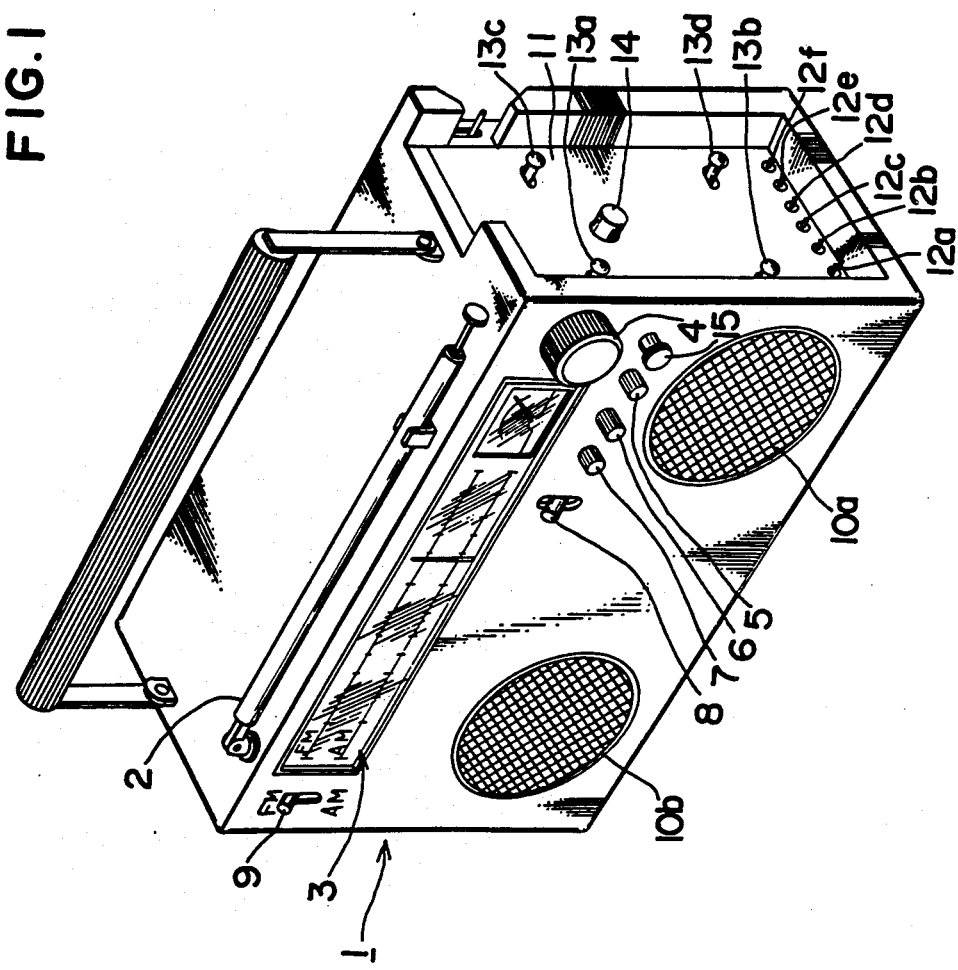
FIG. 1

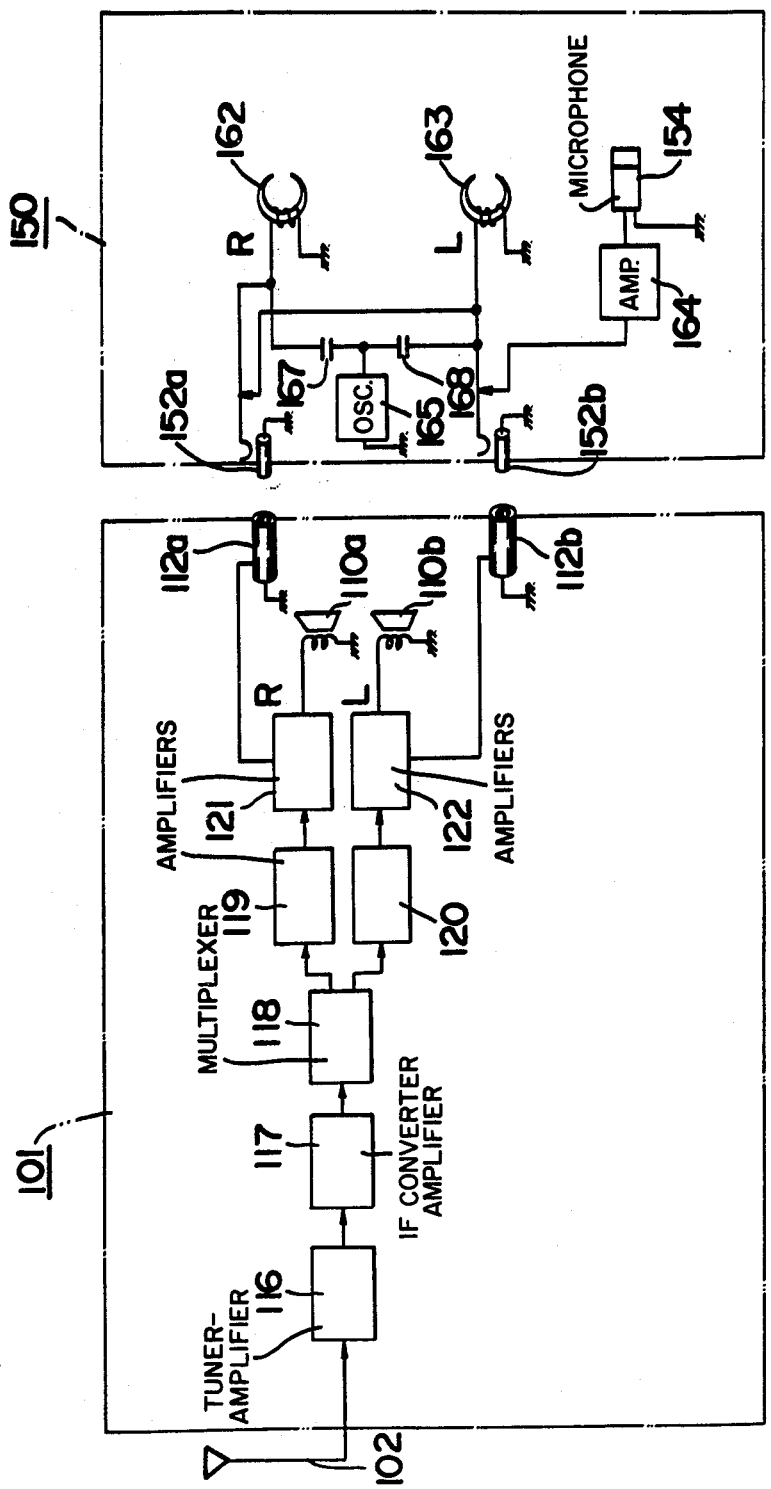

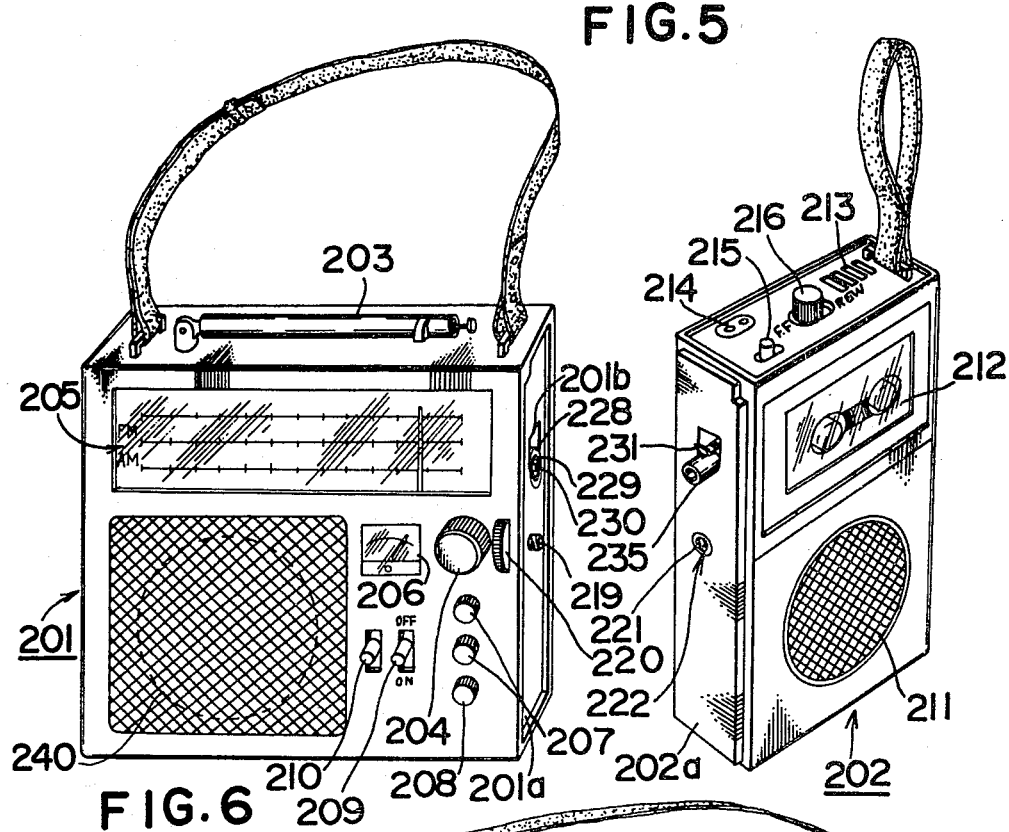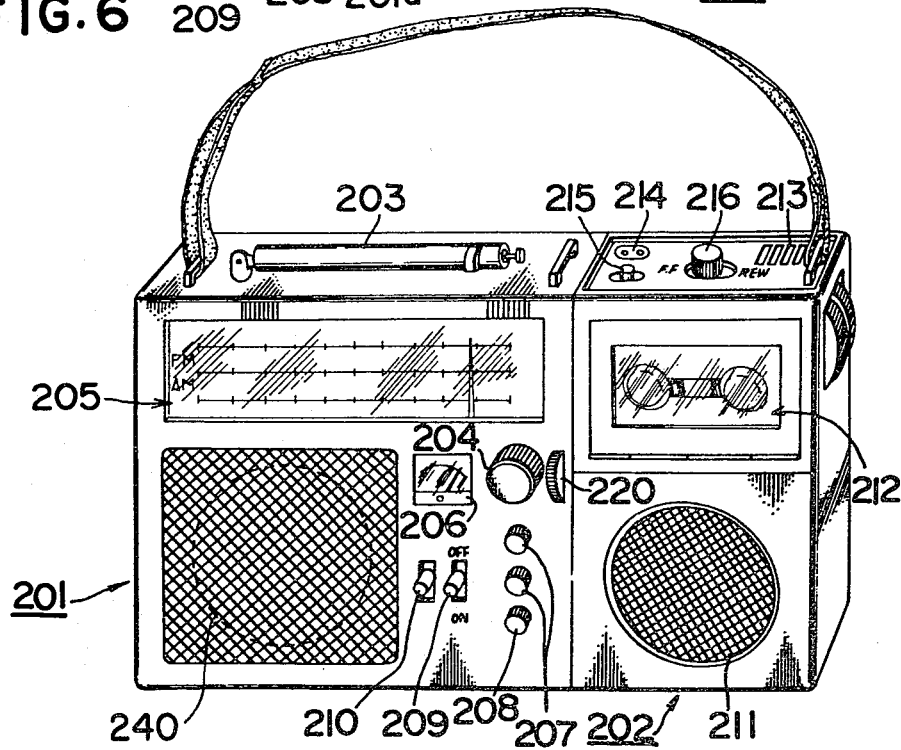

4,151,470

COMBINED PORTABLE TAPE RECORDER AND STEREOPHONIC RECEIVER SYSTEM

RELATED APPLICATIONS

This is a division of application Ser. No. 596,172, filed July 15, 1975, now U.S. Pat. No. 4,046,973.

BACKGROUND OF THE INVENTION

The invention relates to an acoustic apparatus which comprises a detachable combination of a radio set and a tape recorder, and more particularly to such apparatus which comprises a detachable combination of a monaural tape record r or monaural radio set having circuit elements such as a stereophonic head, FM multiplexer or the like but incapable individually of performing the stereophonic function intended by such elements, with another radio set or tape recorder.

A tape recorder with radio set is one of those articles which are under rapid development, in particular since the advent of the cassette tape. This is attributable to the fact that the use of a cassette tape permits the recorder to be constructed in a compact form, thereby rendering it portable. The provision of a radio set together with the recorder permits a selective use of the radio set and the tape recorder, as desired, and also permits a broadcasting program selected by the radio set to be recorded on the tape. However, while the tape recorder with radio set is in wide-spread use, their combined construction increases the composite weight, which is inconvenient for portable use. Specifically, if the composite apparatus is carried about only for the purpose of using the tape recorder, the user must also convey an unnecessary radio set. Such inconvenience will be even greater if several other functions are incorporated into the tape recorder which is provided with a radio set, since the added mechanism or electrical circuit increases the overall bulk and hence the weight.

An acoustic apparatus is already proposed by the present applicant in which a separate radio set and a tape recorder can be detacchably coupled together. In this manner, a desired function can be performed by carrying about only one of them. Such combination permits a choice of operation among a single unit operation as a usual radio set or tape recorder when they are coupled together and when they are separated from each other, a recording of the radio output by the tape recorder when they are coupled together, and a playback of the output from the tape recorder by the radio set when they are coupled together. The purpose of providing such an acoustic apparatus is to provide a compact structure of the tape recorder convenient for portable use. A miniature tape recorder utilizing a miniature tape cassette is already known, which can be advantageously incorporated into the tape recorder of the acoustic apparatus. With this apparatus, only the necessary portion may be carried about to perform an intended operation, thus removing the weight of the unnecessary portion and without an accompanying loss in the functions of a usual tape recorder with radio set.

SUMMARY OF THE INVENTION

It is an object of the invention to provide an acoustic apparatus which comprises a detachable combination of a radio set and a tape recorder wherein a monaural tape recorder or a monaural radio set having a circuit element such as a stereophonic head, FM multiplexer or the like but incapable of performing the stereophonic function intended by the element is combined and detachably coupled with another radio set or tape recorder to thereby enable the stereophonic function to be fully performed.

BRIEF DESCRIPTION OF THE DRAWINGS

FIG. 1 is a perspective view of one embodiment of the acoustic apparatus according to the invention, with an FM stereophonic radio set and a monaural tape recorder having a stereophonic playback head assembly being shown as separated from each other;

FIG. 4 is an electrical circuit diagram of another embodiment of the acoustic apparatus according to the invention in which an FM stereophonic radio set is combined with a monaural tape recorder having a stereophonic recording head assembly;

FIG. 5 is a perspective view of a further embodiment of the acoustic apparatus according to the invention in which a monaural radio set is combined with a monaural tape recorder having a stereophonic head assembly, the radio set and the tape recorder being shown as separated from each other;

FIG. 6 is a perspective view of the assembled radio set and tape recorder shown in FIG. 5;

DETAILED DESCRIPTION OF EMBODIMENTS

Figure 2:
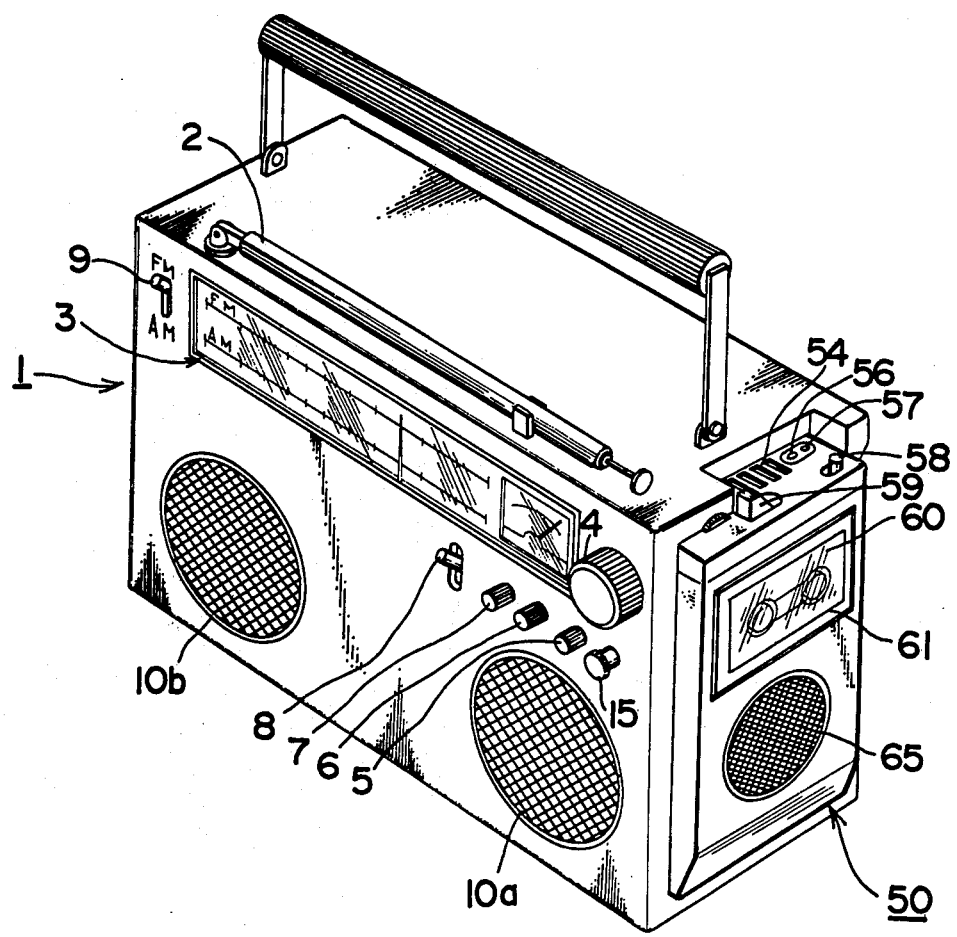
FIG. 2 is a perspective view of the assembled radio set and tape recorder shown in FIG. 1.

In a first embodiment of the invention, an FM stereophonic radio set is combined with a monaural tape recorder which includes a stereophonic playback magnetic head assembly as a stereophonic element. The combination of the tape recorder and radio set forms a stereophonic playback circuit for permitting a stereophonic reproduction from a stereophonically recorded tape by means of the stereophonic playback magnetic head assembly.

FIG. 1 shows, in perspective, an FM stereophonic radio set 1 and a monaural tape recorder 50 having a stereophonic playback magnetic head assembly, as separated from each other. As is conventional, the radio set 1 includes an antenna 2, a tuning dial 3, a tuning knob 4, a volume control 5, tone controls 6, 7, a power switch 8, a mode transfer switch 9 and a pair of loudspeakers 10a, 10b for stereophonic reproduction. At its one lateral side, the radio set 1 is recessed to provide a coupling surface 11 for engagement with the tape recorder, and this surface is surrounded by ribs. A plurality of pins or plugs 12a to 12f are mounted on the coupling surface 11 for electrical interconnection with the tape recorder 50 as the latter is coupled thereto. The pins 12a to 12f have a height which is less than that of the ribs. Also located in the coupling surface are sliding pins 13a to 13d having enlarged heads for securing the tape recorder 50 in position, as well as a knock-out pin 14. The sliding pins 13a, 13b and the sliding pins 13c, 13d are resiliently biased to be moved away from each other, while the knock-out pin 14 is normally resiliently urged to extend outward. A pair of knock-out buttons 15 are located on the front and rear panels of the radio set 1, and can be depressed to move the sliding pins 13a, 13b and the sliding pins 13c, 13d toward each other against the resilient bias.

On its rear side, the tape recorder 50 has a coupling surface 51 for mating engagement with the radio set 1, which surface is formed with a plurality of jacks 52a to 52f adapted to engage the pins 12a to 12f as well as apertures 53a to 53d into which the enlarged head of the sliding pins 13a to 13d fit. When the knock-out buttons 15 are depressed while the radio set 1 and the tape recorder 50 are coupled together, the pins 13 are disengaged from the apertures 53, whereby the tape recorder 50 is urged outward by the pin 14. On the top surface, the tape recorder 50 is provided with an internally housed microphone 54, a volume control 55, an earphone jack 56, a jack 57 for connection with an external microphone, a power switch 58 and a tape rapid advance and rewind operating member 59. On its front surface, the tape recorder 50 is provided with a loading station for a miniature tape cassette 60, a cassette monitoring window 61 and a loudspeaker 65, as shown in FIG. 2. A record-playback operating member (not shown) is mounted on the right-hand lateral side of the tape recorder 50.

Figure 3:
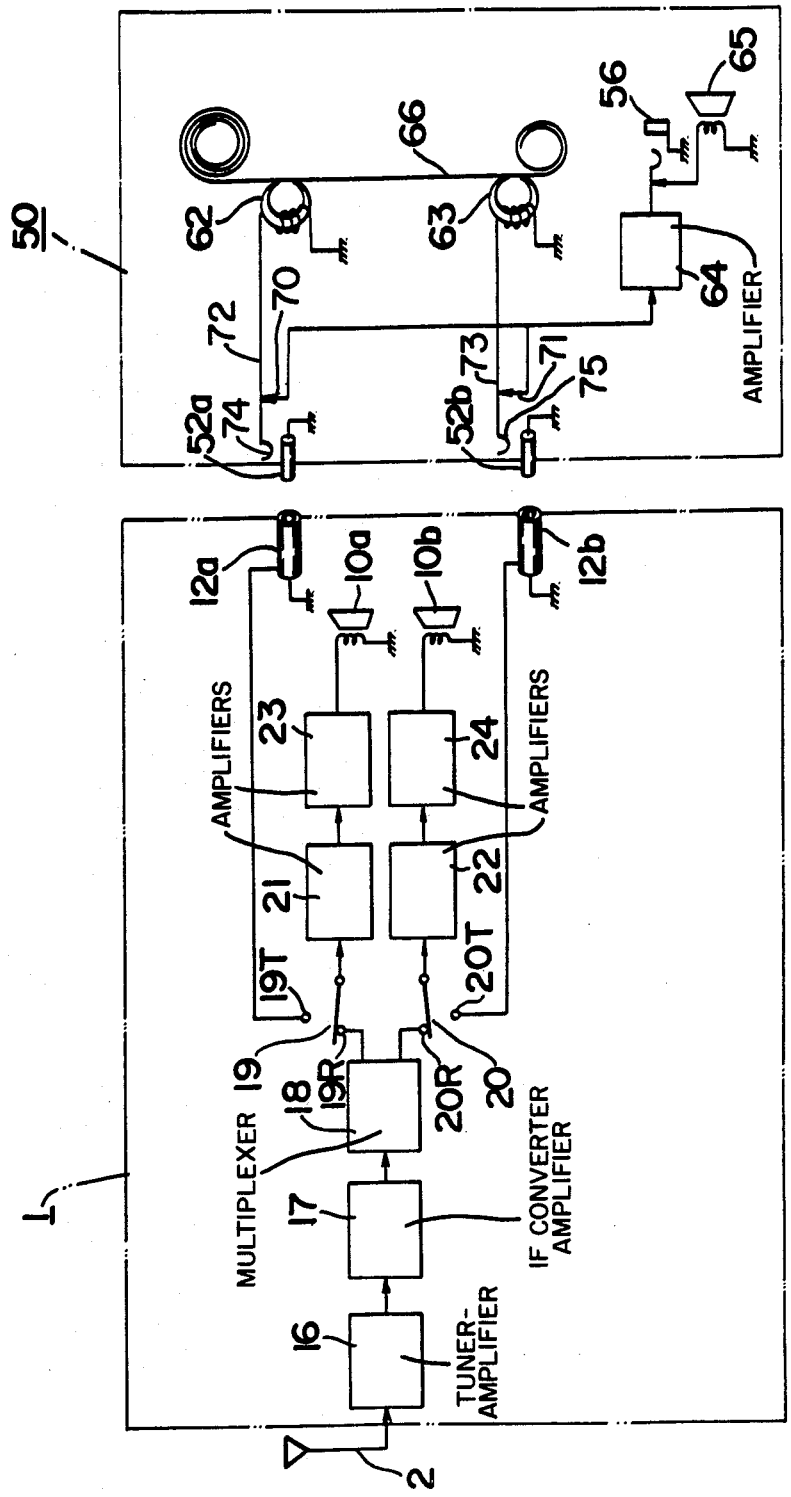
FIG. 3 is an electrical diagram of a combined electrical circuit of the radio set and tape recorder shown in FIG. 1.

FIG. 3 shows the combined electrical circuit of the radio set 1 and the tape recorder 50 when the radio set 1 is in its operation mode for receiving an FM stereophonic broadcasting and the tape recorder 50 is in its playback mode. A signal intercepted by the antenna 2 is sequentially fed through an FM tuner and high frequency amplifier 16, an FM intermediate frequency converter and amplifier 17 and an FM multiplexer 18, reproducing the right and left channel signals of the FM stereophonic broadcasting. When the radio set 1 is used alone to produce a stereophonic reproduction of the FM stereophonic broadcasting, the right and left channel signals are passed through switches 19, 20, right and left channel preamplifiers 21, 22 and right and left channel main amplifiers 23, 24 to right and left channel loudspeakers 10a, 10b, respectively. At this time, the switches 19, 20 assume a radio position 19R, 20R. Switches 19 and 20 are moved between stationary terminals 19R, 20R and 19T, 20T by any suitable means such as a toggle switch. Switches 19 and 20 assume the radio position 19R, 20R when the radio output is applied to speakers 10a, 10b and assume the tape position 19T, 20T when the tape output is applied to speakers 10a, 10b.

The tape recorder 50 includes a pair of playback magnetic heads 62, 63 associated with the right and left channels for producing a stereophonic playback of a stereophonically recorded tape. The heads 62, 63 are electrically connected with jacks 52a, 52b, respectively, and thence to an amplifier 64 in common. The output of the amplifier 64 is connected with the earphone jack 56 and thence to the loudspeaker 65. When the tape recorder 50 and radio 1 are disconnected, stationary contacts 70, 71 are connected to movable spring contacts 72, 73, respectively, and the output of both heads 62, 63 are applied to amplifier 64. Accordingly, whenever tape recorder 50 is separated from radio 1, it operates as a monaural recorder. When radio 1 and tape recorder 50 are coupled together as shown in FIG. 2, pins 12a, 12b engage jacks 52a, 52b contacting rounded ends 74, 75 of movable spring contacts 72, 73, respectively, and disengaging the spring contacts from stationary contacts 70, 71. In this position the output of heads 62, 63 are disconnected from amplifier 64 and applied to amplifiers 21, 22 via switches 19, 20.

In the separated condition shown in FIGS. 1 and 3, the tape recorder 50 can be used alone, reproducing the right and left channel tracks of the stereophonically recorded tape 66 by the magnetic heads 62, 63 respectively, and the respective channel signals can be combined and amplified by the amplifier 64 for listening by the earphone 56 or the loudspeaker 65. When reproducing the stereophonically recorded tape 66 under the condition shown in FIG. 2 where the radio set 1 and the tape recorder 50 are coupled together, the right and left channel signals reproduced by the magnetic heads 62, 63 are transmitted to the radio set 1 through the jacks 52a, 52b and their associated pins 12a, 12b, and thereafter passed through the switches 19, 20 which are now transferred to tape positions 19T, 20T, so that the signals are fed to the right and left channel preamplifiers 21, 22, respectively. The output from these amplifiers are further amplified by the main amplifiers 23, 24 before being fed and reproduced by the loudspeakers 10a, 10b, respectively. In this manner, a stereophonic reproduction is possible under the condition in which the radio set 1 is coupled with the tape recorder 50.

It will be appreciated that in the embodiment described above, the pair of stereophonic playback heads 62, 63 which represents a stereophonic element in the tape recorder 50 can perform its stereophonic function to achieve a stereophonic reproduction from a stereophonically recorded tape when the recorder 50 is coupled with stereophonic radio set 1.

In a second embodiment of the invention to be described below, a monaural tape recorder having a stereophonic recording magnetic head assembly as a stereophonic element is combined with an FM stereophonic radio set to form a stereophonic recording circuit which is adapted to produce a stereophonic recording of a program of an FM stereophonic broadcast on a magnetic tape. Referring to FIG. 4, there is shown a combined electrical circuit of an FM stereophonic radio set 101 and a monaural tape recorder 150 having a stereophonic recording magnetic head assembly, the radio set 101 being shown in the form for reception of an FM stereophonic broadcasting. It should be understood that both the radio set 101 and the tape recorder 150 are similar in appearance and arrangement to those described in connection with the first embodiment, and that they are detachably coupled or separated by a similar mechanism as mentioned previously, so that these aspects will not be repeatedly described herein.

Referring to FIG. 4, a signal intercepted by an antenna 102 is passed through an FM tuner and high frequency amplifier 116, an FM intermediate frequency converter and amplifier 117 and an FM multiplexer 118 in a sequential manner. The multiplexer separates the left and right channel signals of an FM stereophonic signal, the right channel signal being passed through a right channel preamplifier 119 and a main amplifier 121 before being supplied to a right channel loudspeaker 110a. In the similar manner, the left channel signal is passed through a left channel preamplifier 120 and a main amplifier 122 before being supplied to a left channel loudspeaker 110b. An FM stereophonic broadcasting is received and reproduced stereophonically in this manner when the radio set 101 is used alone. Outputs from the right and left channel main amplifiers 121, 122 are also supplied to a pair of pins 112a, 112b, respectively which represent connection plugs with the tape recordr 150. On the other hand, the tape recordr 150 includes a pair of magnetic heads 162, 163 for stereophonic recording, and also includes an amplifier 164 connected with an internally housed microphone 154 (or an external microphone) as well as a bias oscillator 165. When the tape recorder 150 is used alone, the output signal from the internally housed microphone 154 is amplified by the amplifier 164 and supplied to the right and left channel recording heads 162, 163, which are supplied with a bias voltage from the bias oscillator 165 through a pair of capacitors 167, 168, respectively, thus achieving a monaural recording. Because the recording takes place on a pair of tracks which are used for stereophonic recording, there is achieved a high level of recording and an efficient use of the recording tracks.

When the radio set 101 is coupled with the tape recorder 150 so that a program of an FM stereophonic broadcasting received by the radio set 101 may be stereophonically recorded, the output signals from the right and left channel main amplifiers 121, 122 are transmitted to the tape recorder 150 through the pins 112a, 112b and jacks 152a, 152b, thereby feeding the right and left channel heads 162, 163, respectively. In this manner, a program of an FM stereophonic broadcasting can be stereophonically recorded.

It will be appreciated that in the second embodiment described above, the pair of stereophonic recording heads 162, 163 which represent stereophonic elements of the tape recorder 150 is only effective when the recorder 150 is coupled with a stereophonic radio set 101 to provide a stereophonic recording of an FM stereophonic broadcasting intercepted by the FM radio set.

In a third embodiment of the invention to be described below, a monaural tape recorder having a stereophonic playback magnetic head assembly as a stereophonic element is combined with a monaural radio set to form a stereophonic playback circuit, utilizing the amplifier contained within the radio set, thus enabling stereophonic reproduction of a stereophonically recorded tape.

Referring to FIG. 5, there is shown, in perspective, a monaural radio set 201 and a monaural tape recorder 202 having a stereophonic playback magnetic head assembly, which are shown separated from each other. The radio set 201 includes a tuner, an amplifier and a loudspeaker in the conventional manner, and is externally provided with an antenna 203, a tuning knob 204, a tuning dial 205, a level check meter 206, tone controls 207, a volume control 208, a power switch 209, and a check meter transfer switch 210. The radio set is arranged to be usable as a conventional monaural radio set by itself. The transfer switch 210 may be changed between a level check position and a battery check position in which the voltage lever (i.e. "condition") of a storage battery contained within the radio set 201 can be displayed.

On its front side, the tape recorder 202 includes a loudspeaker opening covered with a meshwork 211 and a cover plate 212 for loading a tape cassette. The recorder 202 internally contains a tape drive mechanism, a magnetic head assembly and an amplifier. On its top, the recorder is provided with a grille 213 for an internally housed microphone, an earphone jack 214, a power switch 215 and a tape rapid advance and rewind knob 216, so as to permit it to be used as a conventional tape recorder by itself.

Figure 7:
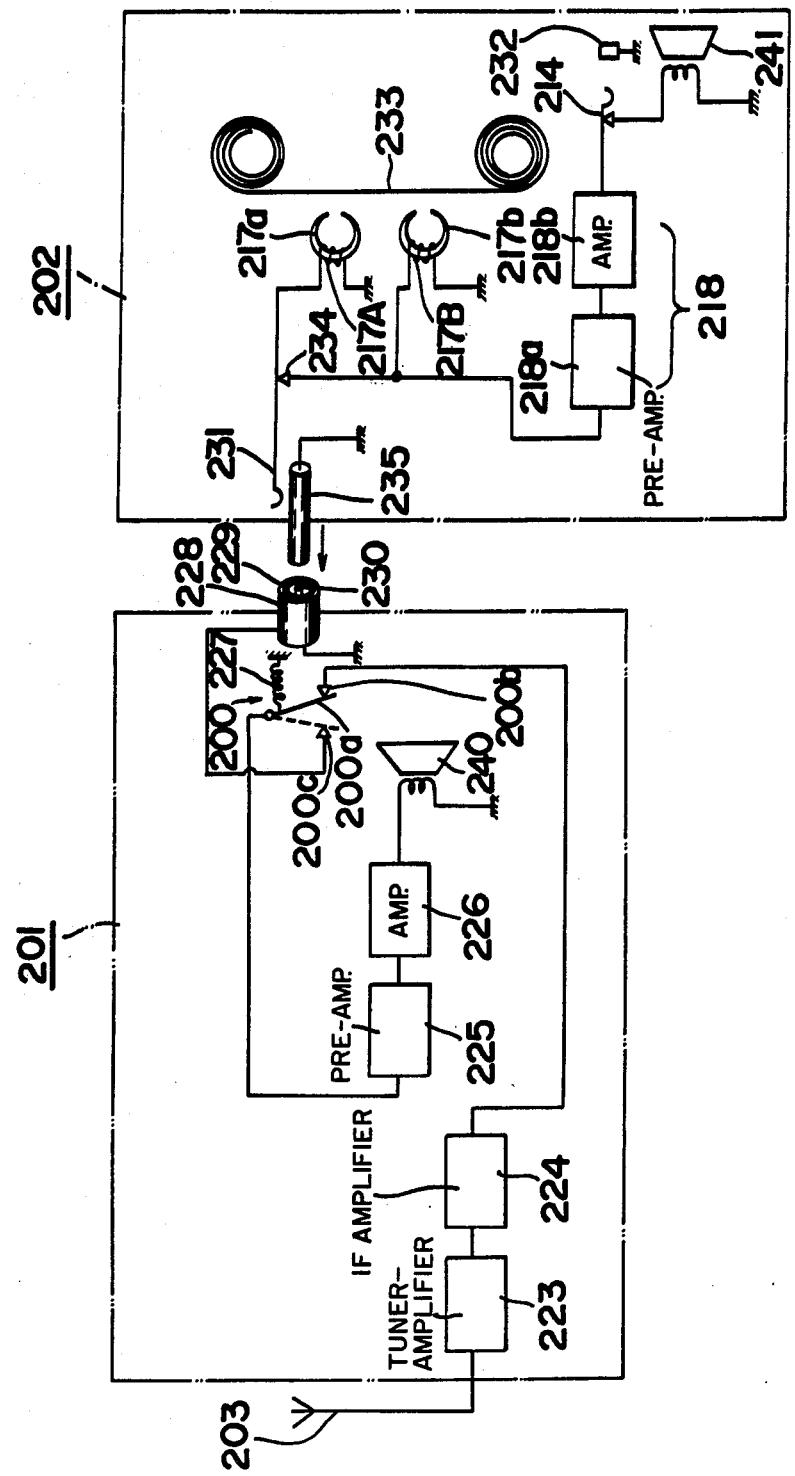
FIG. 7 is a circuit diagram of the combined electrical circuit of the radio set and the tape recorder shown in FIG. 5.

As indicated in FIG. 7, the magnetic head assembly contained in the tape recorder 202 includes a pair of stereophonic magnetic heads 217a, 217b, which, however, are associated with a single channel playback amplifier 218.

The radio set 201 and the tape recorder 202 can be detachably coupled in a manner as mentioned below. Specifically, the radio set 201 is formed along its one of lateral sides with a recess 201a while a convex area 202a having a commensurate area conforming with the recess 201a is formed on one lateral side of the tape recorder 202 for fitting engagement with the recess 201a. It is to be noted that the recess 201a of the radio set 201 and the convex area 202a of the tape recorder 202 are formed on selected lateral sides such that a loudspeaker 240 contained in the radio set 201 and a loudspeaker 241 (see FIG. 7) contained in the tape recorder 202 are directed in the same direction when the radio set and the tape recorder are coupled together. Thus, as viewed in FIG. 5, the recess 201a is on the right-hand side of the radio set 201 and the convex area 202a is on the left-hand side of the tape recorder 202.

A male screw 219 projects substantially centrally through the recess 201a of the radio set 201 and is adapted to be rotated by turning a coupling knob 220 which is exposed on the front panel of the radio set 201. A mating female screw 221 is formed substantially centrally in the convex area 202a of the tape recorder 202, the female screw 221 being formed in a coupling hole 222. Thus, when the convex area 202a is fitted into the recess 201a to couple the tape recorder 202 with the radio set 201, the coupling knob 220 may be turned to drive the male screw 219 into threaded engagement with the female screw 221 to cause both units to be firmly coupled. When the two units are to be separated, the knob 220 may be turned in the opposite direction, whereby the male screw 219 is withdrawn from the female screw 221, permitting the mating recess and convex area to be easily separated.

The electrical circuits of the radio set 201 and the tape recorder 202 are shown in FIG. 7. It should be understood that the illustrated circuit is only part of the overall circuit which is essential to the operation of the invention.

Specifically, the radio set 201 includes a tuner and high frequency amplifier 223, an intermediate frequency amplifier 224, a transfer switch 200 for connecting either the output of the amplifier 224 or the reproduced output from the tape recorder 202 to a preamplifier 225, a main amplifier 226 which amplifies the output signal from the preamplifier 225, and a loudspeaker 240 connected with the output of the main amplifier 226. The transfer switch 200 includes a pair of stationary contacts 200b, 200c and a movable contact 200a, which is normally urged into engagement with stationary contact 200b, by the resilience of a tension spring 227. The stationary contact 200b is connected with the output of the amplifier 224 and the movable contact 200a which normally engages this stationary contact 200b is connected with the input of the preamplifier 225. Thus when the radio set 201 is not coupled with the tape recorder 202 and is used alone, it operates as a conventional radio set through the electrical circuit comprising the tuner and high frequency amplifier 223, the intermediate frequency amplifier 224, the stationary contact 200b, the movable contact 200a, the preamplifier 225, the main amplifier 226 and the loudspeaker 240.

The other stationary contact 200c of the switch 200 is connected with an interconnection member 228 which serves as the means for transmitting the output signal from one of the heads of the tape recorder 202 to the preamplifier 225 of the radio set 201 through the transfer switch 200 when the tape recorder 202 is coupled with the radio set 201. The interconnection member 228 is in the form of an electrically conductive tube lined with an inner tube 229 of an insulating material with a guide pin 230 disposed along the axis thereof. One end of the interconnection member 228, the insulating tube 229 and the guide pin 230 is exposed in the recess 201a of the radio set 201, as indicated in FIG. 5. A notch 201b is formed in the recess 201a adjacent to the exposed end of the interconnection member 228 and is adapted to receive an electrical signal transmission piece 231, which is located on the tape recorder 202 for contact with the outer surface of the interconnection member 228 when the tape recorder 202 is coupled with the radio set 201.

As shown in FIG. 7, the electrical circuit of the tape recorder 202 includes a pair of stereophonic playback magnetic heads 217a, 217b, a single channel playback amplifier 218, a loudspeaker 241 and an earphone jack 214. As is well known, the pair of heads 217a, 217b are disposed for bearing engagement, when required, with a tape 233 which is loaded into the tape recorder 202, for playback and recording operation of the tape. One of the heads, 217a, has its coil 217A connected with the ground at one end thereof, while its other end is connected with the signal transmission piece 231. The other head 217b has its coil 217B connected with the ground at its one end, and is also connected with the input of a preamplifier 218a preceding a main playback amplifier 218b, and also with a stationary terminal 234 which is normally engaged by the signal transmission piece 231. The single channel playback amplifier 218 comprises the preamplifier 218a and a main amplifier 218b, the output of which is connected with the loudspeaker 241 through the earphone jack 214. When an earphone (not shown) is inserted into the earphone jack 214 through an opening 232, sound recorded on a tape can be reproduced by the earphone.

The tape recorder 202 is provided with a transfer member 235 which interfits with and is guided by the guide pin 230 on the radio set 201 for switching the transfer switch 200. When the tape recorder 202 is coupled with the radio set 201, the transfer member 235 cooperates with the transfer switch 200 to detect such coupling, and also automatically switches the transfer switch, making the amplifiers 225, 226 of the radio set 201 to be ready for use as a stereophonic amplifier for the tape recorder 202.

The transfer member 235 is in the form of a pipe having an inner diameter which fits the guide pin 230 and an outer diameter which fits inside the insulating tube 229. When it is guided by the guide pin 230 to fit in the insulating tube 229, the inner end of the transfer member 235 extends through the insulating tube 229 into the radio set 201, operating the transfer switch 200 located adjacent to the interconnection member 228, thus switching it. As shown in FIG. 5, the transfer member 235 is mounted on the convex area 202a of the tape recorder 202 and is located in alignment with the insulating tube 229 in the recess 201a when the convex area 202a is brought into opposing relationship with the recess 201a. The signal transmission piece 231 extends directly above the transfer member 235, and is formed by a resilient piece. It is disengaged from the terminal 234 when it engages and rides on the outer surface of the member 228 against its resilient bias.

It will be understood that when the tape recorder 202 is used alone, and thus is not coupled with the radio set 201, the output from the magnetic heads 217a, 217b is fed to the preamplifier 218a, main amplifier 218b and loudspeaker 241 (or earphone), thus enabling the recorder to be used as a conventional monaural unit.

When the tape recorder 202 is coupled with the radio set 201 to provide a stereophonic reproduction from a stereophonically recorded tape, the convex area 202a of the tape recorder 202 is fitted into the recess 201a of the radio set 201, and then the coupling knob 220 is turned to drive the male screw 219 into the female screw 221 formed in the coupling hole 222 of the tape recorder, whereupon the radio set 201 and the tape recorder 202 are firmly coupled together as shown in FIG. 6. When the coupling is completed in this manner, the inner end of the transfer member 235 extends through the insulating tube 229 into the interior of the radio set 201, moving the movable contact 200a of the transfer switch 200 from the stationary contact 200b to the other stationary contact 200c, against the resilient bias of the spring 227. At the same time, the signal transmission piece 231 is brought into contact with the outer surface of the interconnection member 228 of the radio set 201, whereupon the piece 231 is moved away from the stationary contact 234. After coupling the two units 201 and 220, a stereophonically recorded tape 233 can be loaded into the tape recorder 202 and the latter set in playback mode. A signal from one of the tracks of the stereophonic tape, for example, a signal from the left channel, is passed from the magnetic head 217a through the signal transmission piece 231, the interconnection member 228, the stationary contact 200c of the switch 200, the movable contact 200a of the switch 200, the preamplifier 225, the main amplifier 226 to the loudspeaker 240, thus providing a reproduction of the left channel by the loudspeaker 240. A signal from the other track of the stereophonic tape, for example, a signal from the right channel, is passed from the magnetic head 217b through the preamplifier 218a and the main amplifier 218b to the loudspeaker 241, thus providing reproduction of the right channel by the loudspeaker 241 of the tape recorder 202. In this manner, in accordance with the invention, a stereophonic reproduction of a stereophonically recorded tape is possible by using the radio set and the tape recorder both of which only have a single channel amplifier path. In addition, when a tape recorder having a stereophonic head assembly and a single channel amplifier is coupled with a monaural radio set, the detection of the coupling therebetween is effective to switch the amplifier of the radio set into a stereophonic amplifier automatically, thus immediately enabling a stereophonic reproduction upon coupling the radio set and the tape recorder, without requiring a manual intervention.

While the first and third embodiments deal with a stereophonic reproduction of a stereophonically recorded tape, a monaural tape may be used. In this instance, the sound recorded will be reproduced by the stereophonic playback circuit, and will be reproduced by both speakers associated with the radio set and the tape recorder. Because of the increased amplifier channels and loudspeakers, the overall acoustic performance of the reproduced sound will be improved, giving a pseudo-stereophonic sensation.

In a fourth embodiment of the invention to be described below, an FM radio set having an FM multiplexer as a stereophonic element as well as an external output terminal thereof is combined with a monaural tape recorder so as to permit an FM stereophonic broadcasting to be reproduced. As is well known, a wave of an FM stereophonic broadcasting comprises both (left signal+right signal) and (left signal−right signal), so that they can be separated and separately amplified to drive respective loudspeakers for enabling a reproduction of a stereophonic broadcasting. It follows therefore that two amplifier channels are required. A circuit which separates an FM wave of a stereophonic broadcasting into (left signal+right signal) and (left signal−right signal) for application to separate amplifiers is referred to as an FM multiplexer. When a monaural FM radio set is used to receive such FM wave, the loudspeaker of the radio set will only reproduce the combination (left signal+right signal). In the present embodiment, an amplifier contained in a monaural tape recorder is utilized to convert a monaural FM radio set into a stereophonic FM radio set.

Figure 8:
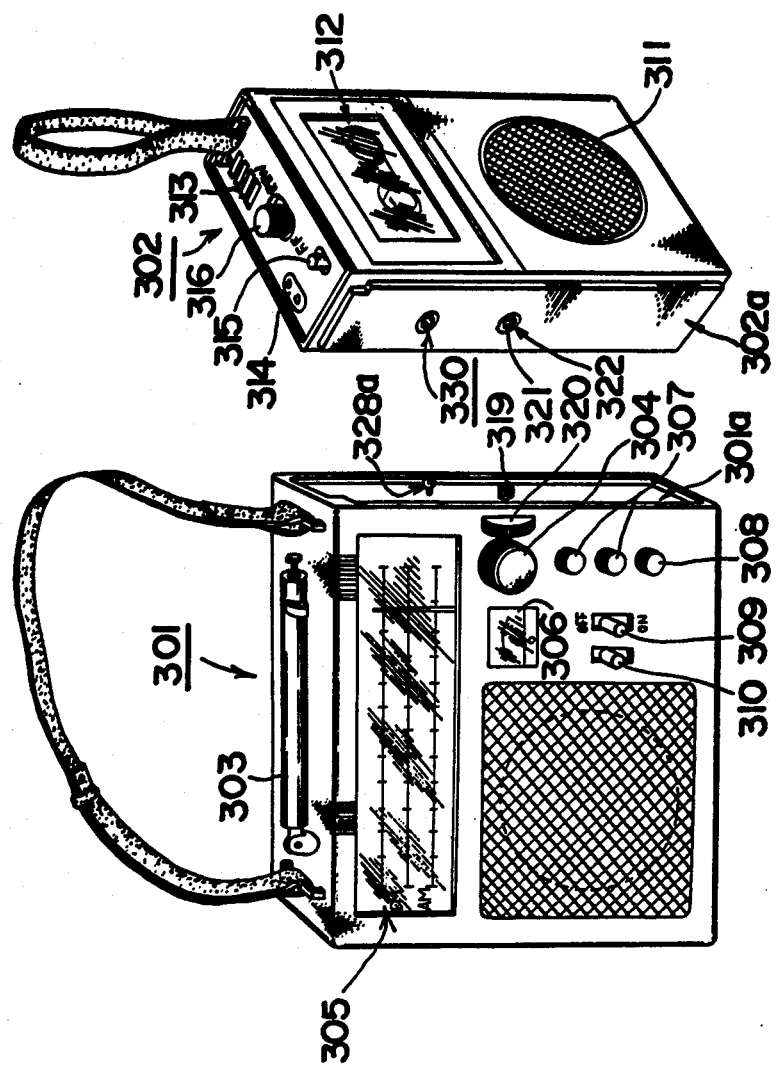
FIG. 8 is a perspective view of an additional embodiment of the acoustic apparatus according to the invention in which an FM monaural radio set having an FM multiplexer is combined with a monaural tape recorder, the radio set and tape recorder being shown as separated from each other.

FIG. 8 shows a monaural FM radio set 301 and a monaural tape recorder 302, as separated from each other. The radio set 301 internally houses an FM tuner and an amplifier as well as a loudspeaker, and is externally provided with an antenna 303, a tuning knob 304, a dial 305, a level check meter 306, tone control 307, a volume control 308, a power switch 309 and a transfer switch 310. It can be used alone as a usual monaural FM radio set.

The tape recorder 302 is provided with a cover plate 312 for loading a tape cassette as well as a meshwork 311 which covers a loudspeaker opening on its front panel. The recorder internally houses a tape drive mechanism, a magnetic head and an amplifier. On its top, the recorder is provided with a grille 313 for an internally housed microphone, an earphone jacck 314, a power switch 315, and a tape rapid advance and rewind knob 316. It can be used alone as a usual tape recorder.

The mechanism for detachably coupling the radio set and the tape recorder is constructed in the similar manner as described previously in connection with the third embodiment. Specifically, a pair of mating surfaces are formed by a recess 301a on one lateral side of the radio set 301 and a convex area 302a on one lateral side of the tape recorder 302. By turning a coupling knob 320 to drive a male screw 319 into a female screw 321 formed in a coupling hole 322, the units 301 and 302 can be coupled together. If the knob 320 is turned in the opposite direction, the male screw 319 can be withdrawn from the female screw 321 to separate the two units.

Figure 9:
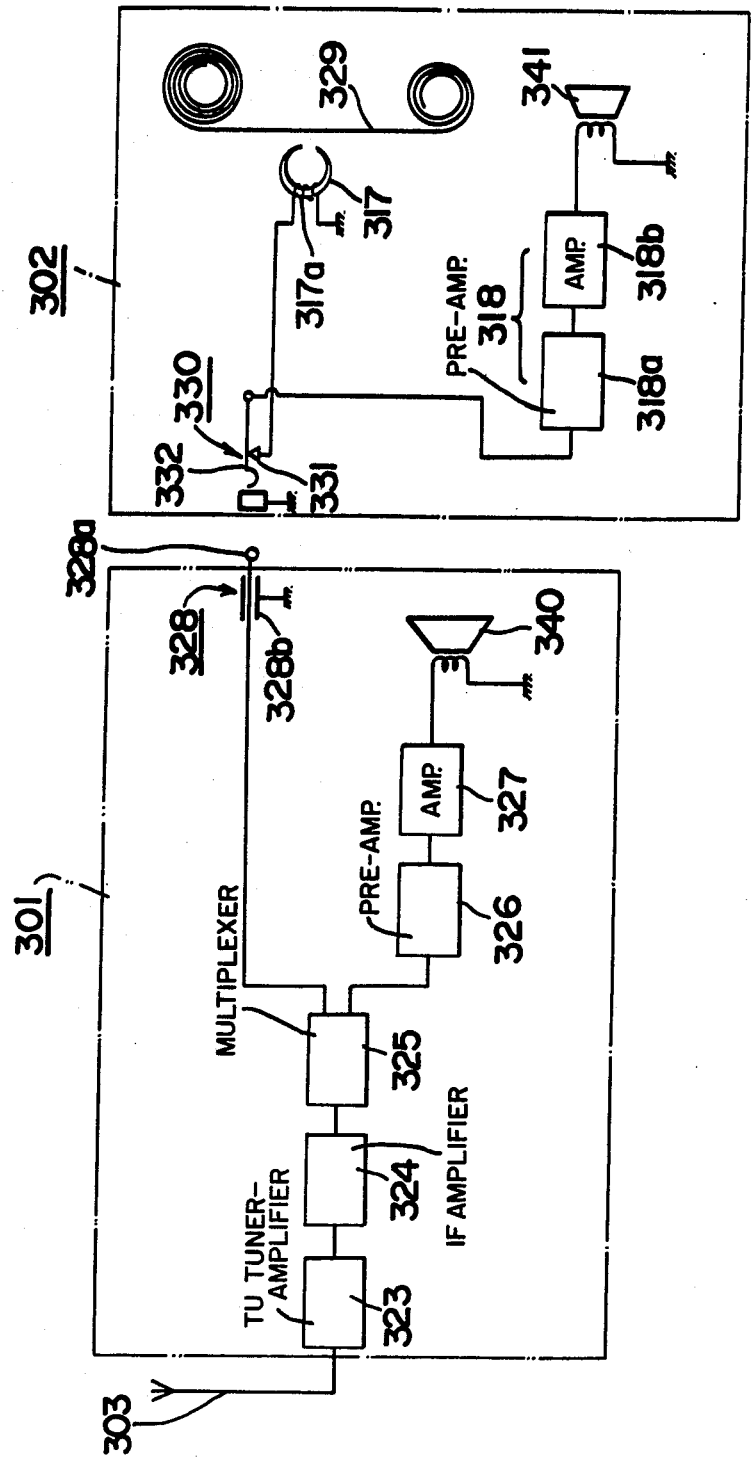
FIG. 9 is a circuit diagram of the combined electrical circuit of the radio set and tape recorder shown in FIG. 8.

FIG. 9 shows the respective electrical circuits of the radio set 301 and the tape recorder 302. Specifically, the radio set 301 includes an FM tuner and high frequency amplifier 323, an intermediate frequency amplifier 324, an FM multiplexer 325, a preamplifier 326 connected with one output terminal of the multiplexer 325 for amplifying a channel signal which represents the (left signal+right signal) channel of a stereophonic FM broadcasting wave, a main amplifier 327 for amplifying an output signal from the preamplifier 326 a loudspeaker 340 connected with the output of the main amplifier 327, and an interconnection plug 328 connected with the other output terminal of the multiplexer 325.

The plug 328 forms an external output terminal of the multiplexer 325, where a signal of the (left signal−right signal) channel of the stereophonic FM wave is available. The plug 328 is conventional in construction, and comprises a signal transmission member 328a and a ground connection member 328b, which serves to transmit the signal of the last mentioned channel to an external amplifier. As indicated in FIG. 8, the signal transmission member 328a has its free end exposed in the recess 301a of the radio set 301.

The tape recorder 302 includes a magnetic head 317, a single channel playback amplifier 318 and a loudspeaker 341. The head 317 is disposed for bearing engagement with a tape 329 loaded into the tape recorder 302 for the purpose of playback or recording, as required. One end of a coil 317a associated with the head 317 is connected with the ground, while its other end is electrically connected with a stationary contact 331 of a jack 330. The jack 330 includes a movable contact 332 which normally bears against the stationary contact 331 and which is electrically connected with an input terminal of a preamplifier 318a which forms part of the playback amplifier 318. Thus, the magnetic head is normally connected with the preamplifier 318a. The movable contact 332 and the stationary contact 331 form a jack switch, and when the plug 328 is inserted into the jact 330, the signal transmission member 328a of the plug 328 engages the movable contact 332 and simultaneously moves it away from the stationary contact 331. It will be noted that the amplifier 318 includes a main amplifier 318b in addition to the preamplifier 318a. As shown in FIG. 8, the free end of the jack 330 is exposed in the convex area 302a of the tape recorder 302.

When the tape recorder 302 is mechanically coupled with the radio set 301, the plug 328 is inserted into the jack 330 of the recorder, whereby the signal transmission member 328a engages the movable contact 332 of the jack switch and moves it away from the stationary contact 331. As a consequence, the external output terminal of the FM multiplexer 325 which is formed by the signal transmission member 328a, is connected with the input terminal of the preamplifier 318a of the tape recorder 302. When an FM wave of a stereophonic broadcast is intercepted by the radio set 301, a signal of the channel (left signal + right signal) of the wave is directed by the multiplexer 325 to a path comprising the preamplifier 326, the main amplifier 327 and the loudspeaker 340, thereby reproducing sound by the loudspeaker 340. On the other hand, a signal of the other channel (left signal − right signal) of the FM wave is directed by the multiplexer 325 to a path comprising the signal transmission member 328a, the movable contact 332 of the jack 330, the preamplifier 318a, the main amplifier 318b and the loudspeaker 341, thus reproducing sound by the loudspeaker 341. In this manner, the combination of both speakers 340, 341 enables a stereophonic reproduction of a stereophonic broadcasting.

What is claimed is:

1. Portable stereophonic apparatus, comprising:
a portable tape recorder including a left channel and a right channel record head; and a first amplifier coupled in series with a microphone;
an FM stereophonic radio including an FM stereophonic tuner and a stereo multiplexer electrically connected to said tuner for generating left and right channel signals, said stereophonic radio also including a left channel amplifier in series with a left channel speaker and a right channel amplifier in series with a right channel speaker;

means for mechanically coupling and decoupling said portable tape recorder to said radio such that said tape recorder and radio may be decoupled to form two independent units or coupled to form a single integrated unit;

first and second electrical connector means associated with said stereophonic radio;

third and fourth electrical connector means associated with said portable tape recorder, said first and third electrical connector means adapted to be electrically connected and said second and fourth electrical connector means adapted to be electrically connected when said tape recorder and radio are mechanically coupled to form a single integrated unit;

first switch means for connecting the outputs of both said left channel and said right channel record heads to said first amplifier when said tape recorder and radio are decoupled whereby said tape recorder operates as a monaural recorder, said first switch means also for connecting said left channel and said right channel record heads to said third and fourth electrical connector means, respectively, when said tape recorder and radio are mechanically coupled to form a single integrated unit;

means for connecting said left and right channel signals to said left and right channel amplifiers, respectively, such that said tape recorder operates as a stereophonic tape recorder when said tape recorder and radio are mechanically coupled to form a single integrated unit.

2. A portable stereophonic apparatus as claimed in claim 1 wherein one of said first and third electrical connector means is a jack and the other of said first and third electrical connector means is a mating pin, and wherein one of said second and fourth electrical connector means is a jack and the other of said second and fourth electrical connector means is a mating pin.

3. Apparatus in accordance with claim 2 wherein said first switch means comprises a first and a second spring switches both of which are coupled to said first amplifier when said radio and said tape recorder are decoupled, said first and second spring switches adapted to be contacted by said jack or pin associated with said first and second electrical connector means, respectively, when said tape recorder is coupled to said radio such that said first and second spring switches are disconnected from said first amplifier and are electrically connected to said first and second electrical connector means, respectively.

4. A portable stereophonic apparatus as claimed in claim 1 further including bias oscillator means for simultaneously applying a bias voltage to said first and second recording heads during a recording operation.

* * * * *